US011955144B2

(12) United States Patent
Spreitzer

(10) Patent No.: US 11,955,144 B2
(45) Date of Patent: Apr. 9, 2024

(54) VIDEO CREATION AND EDITING AND ASSOCIATED USER INTERFACE

(71) Applicant: Snap Inc., Santa Monica, CA (US)

(72) Inventor: Kenneth Jay Spreitzer, San Francisco, CA (US)

(73) Assignee: Snap Inc., Santa Monica, CA (US)

(*) Notice: Subject to any disclaimer, the term of this patent is extended or adjusted under 35 U.S.C. 154(b) by 2 days.

(21) Appl. No.: 17/512,039

(22) Filed: Oct. 27, 2021

(65) Prior Publication Data

US 2022/0208230 A1    Jun. 30, 2022

Related U.S. Application Data

(60) Provisional application No. 63/131,392, filed on Dec. 29, 2020.

(51) Int. Cl.
| | | |
|---|---|---|
| *G11B 27/036* | (2006.01) | |
| *G06F 3/04842* | (2022.01) | |
| *G06F 3/04847* | (2022.01) | |
| *G06F 3/04886* | (2022.01) | |
| *G11B 27/034* | (2006.01) | |
| *G11B 27/34* | (2006.01) | |

(52) U.S. Cl.
CPC ........ *G11B 27/036* (2013.01); *G06F 3/04842* (2013.01); *G06F 3/04847* (2013.01); *G06F 3/04886* (2013.01); *G11B 27/034* (2013.01); *G11B 27/34* (2013.01)

(58) Field of Classification Search
CPC ..... G11B 27/036; G11B 27/034; G11B 27/34; G06F 3/04842; G06F 3/04847
See application file for complete search history.

(56) References Cited

U.S. PATENT DOCUMENTS

| 8,745,500 B1* | 6/2014 | Kostello | G11B 27/031 |
| | | | 386/282 |
| 8,873,936 B1* | 10/2014 | Itelman | G11B 27/038 |
| | | | 386/278 |
| 9,208,819 B1* | 12/2015 | Gregg | G11B 27/034 |

(Continued)

FOREIGN PATENT DOCUMENTS

WO    WO-2021118710 A1    6/2021

OTHER PUBLICATIONS

"International Application Serial No. PCT/US2021/064337, International Search Report dated Apr. 7, 2022", 4 pgs.

(Continued)

*Primary Examiner* — Jeremy L Stanley
(74) *Attorney, Agent, or Firm* — Schwegman Lundberg & Woessner, P.A.

(57) ABSTRACT

A method of generating a modified video file via a user interface presented on a mobile device including a display is disclosed. The method comprises displaying media corresponding to a first video file on a display of the mobile video device. In response to receiving an initial user input, generation of a second video file corresponding to the displayed media commences. During the displaying of the media corresponding to the first video file, user inputs to manipulate the first video file are received. The second video file is then generated from the first video file as manipulated by the user inputs. A sequence of versions of the video file may be created in a similar manner, which are selectable via a video version stack.

20 Claims, 12 Drawing Sheets

(56) References Cited

U.S. PATENT DOCUMENTS

| | | | |
|---|---|---|---|
| 10,622,017 B1* | 4/2020 | Klitsner | H04N 21/41407 |
| 10,867,634 B1* | 12/2020 | Hirschi | G11B 27/02 |
| 10,972,682 B1* | 4/2021 | Muenster | H04N 5/272 |
| 11,165,729 B1* | 11/2021 | Plom | H04L 51/063 |
| 2001/0020953 A1* | 9/2001 | Moriwake | G11B 27/034 |
| | | | 348/E5.051 |
| 2004/0001079 A1* | 1/2004 | Zhao | G11B 27/034 |
| 2008/0155421 A1* | 6/2008 | Ubillos | G11B 27/031 |
| | | | 715/838 |
| 2010/0027958 A1* | 2/2010 | Ubillos | G11B 27/034 |
| | | | 386/243 |
| 2010/0231536 A1 | 9/2010 | Chaudhri et al. | |
| 2010/0247062 A1* | 9/2010 | Bailey | G11B 27/034 |
| | | | 386/280 |
| 2010/0281384 A1* | 11/2010 | Lyons | G06F 3/0482 |
| | | | 715/753 |
| 2011/0037777 A1* | 2/2011 | Lindahl | H04N 21/47205 |
| | | | 715/810 |
| 2012/0210228 A1* | 8/2012 | Wang | G11B 27/007 |
| | | | 715/723 |
| 2013/0047082 A1* | 2/2013 | Long | G06F 3/04817 |
| | | | 715/708 |
| 2013/0235069 A1* | 9/2013 | Ubillos | G06T 11/001 |
| | | | 345/593 |
| 2013/0236093 A1* | 9/2013 | Gatt | G06F 3/04842 |
| | | | 382/311 |
| 2013/0239056 A1* | 9/2013 | Ubillos | G06F 3/04847 |
| | | | 715/833 |
| 2014/0075310 A1* | 3/2014 | Li | G11B 27/34 |
| | | | 715/716 |
| 2014/0075316 A1* | 3/2014 | Li | G06F 16/435 |
| | | | 715/719 |
| 2014/0355961 A1* | 12/2014 | Paulus | G06F 3/04847 |
| | | | 386/282 |
| 2015/0043751 A1* | 2/2015 | Chen | H03G 3/20 |
| | | | 381/107 |
| 2015/0135049 A1* | 5/2015 | Murphy | H04N 21/47205 |
| | | | 715/205 |
| 2015/0147048 A1* | 5/2015 | Kim | G06F 3/04886 |
| | | | 386/282 |
| 2015/0155008 A1* | 6/2015 | Herberger | G11B 27/034 |
| | | | 386/224 |
| 2015/0179223 A1* | 6/2015 | Leppanen | H04N 21/47205 |
| | | | 386/282 |
| 2015/0220249 A1* | 8/2015 | Snibbe | G06F 3/0412 |
| | | | 715/719 |
| 2015/0221339 A1* | 8/2015 | Snibbe | H04N 21/854 |
| | | | 386/285 |
| 2015/0234564 A1* | 8/2015 | Snibbe | G06F 3/04842 |
| | | | 715/716 |
| 2015/0310896 A1* | 10/2015 | Bredow | G11B 27/031 |
| | | | 386/230 |
| 2015/0318020 A1* | 11/2015 | Pribula | H04N 21/2743 |
| | | | 386/290 |
| 2015/0339010 A1* | 11/2015 | Pamuru | G06F 3/0482 |
| | | | 715/726 |
| 2015/0365587 A1* | 12/2015 | Ha | G11B 27/28 |
| | | | 715/721 |
| 2016/0054873 A1* | 2/2016 | Snibbe | G06F 3/04842 |
| | | | 715/719 |
| 2016/0172000 A1* | 6/2016 | Ju | H04N 9/8042 |
| | | | 386/241 |
| 2016/0173960 A1* | 6/2016 | Snibbe | H04N 21/2353 |
| | | | 386/285 |
| 2016/0202882 A1* | 7/2016 | Mortillaro | G06T 13/80 |
| | | | 715/719 |
| 2016/0216871 A1* | 7/2016 | Stamatiou | G06F 3/04845 |
| 2016/0353053 A1* | 12/2016 | Mori | G11B 27/34 |
| 2016/0358631 A1* | 12/2016 | Lee | G11B 27/105 |
| 2017/0024110 A1* | 1/2017 | Xu | G11B 27/34 |
| 2017/0064245 A1* | 3/2017 | Liu | G11B 27/28 |
| 2017/0169039 A1* | 6/2017 | Brown | H04N 21/475 |
| 2017/0256288 A1* | 9/2017 | Ai | H04N 5/2628 |
| 2017/0262247 A1* | 9/2017 | Yoganandan | G06F 3/1446 |
| 2018/0053531 A1* | 2/2018 | Wrzesinski | H04N 9/8211 |
| 2018/0095635 A1* | 4/2018 | Valdivia | G06F 3/02 |
| 2018/0107353 A1* | 4/2018 | Lee | G06F 3/0482 |
| 2018/0146217 A1* | 5/2018 | Kedenburg, III | H04N 21/422 |
| 2018/0150216 A1* | 5/2018 | Choi | G06F 3/0412 |
| 2018/0210643 A1* | 7/2018 | Ghassabian | G06F 3/04883 |
| 2018/0239524 A1* | 8/2018 | Snibbe | G11B 27/34 |
| 2018/0279007 A1* | 9/2018 | Peterson | H04N 21/4821 |
| 2018/0330756 A1* | 11/2018 | MacDonald | G06F 16/951 |
| 2018/0349019 A1* | 12/2018 | Eim | G06F 3/04817 |
| 2019/0018572 A1* | 1/2019 | Jaini | H04N 21/47202 |
| 2019/0026015 A1* | 1/2019 | Lee | G11B 27/34 |
| 2019/0082215 A1* | 3/2019 | Horiguchi | H04N 21/4728 |
| 2019/0265875 A1* | 8/2019 | Park | G06F 3/04847 |
| 2019/0364211 A1* | 11/2019 | Chun | H04N 21/44008 |
| 2020/0296317 A1* | 9/2020 | Post, Jr. | H04N 7/0122 |
| 2020/0321029 A1* | 10/2020 | Cui | H04N 21/4316 |
| 2021/0035609 A1* | 2/2021 | Zhao | H04N 5/76 |
| 2021/0060433 A1* | 3/2021 | Projansky | A63F 13/92 |
| 2021/0134328 A1* | 5/2021 | Chung | G06F 3/0488 |
| 2021/0158592 A1* | 5/2021 | Sakai | G06T 13/40 |
| 2021/0190594 A1* | 6/2021 | Mead | G01J 5/0265 |
| 2022/0100361 A1* | 3/2022 | Feng | G06F 3/0488 |

OTHER PUBLICATIONS

"International Application Serial No. PCT/US2021/064337, Written Opinion dated Apr. 7, 2022", 5 pgs.

* cited by examiner

VIDEO CREATION AND EDITING AND ASSOCIATED USER INTERFACE

RELATED APPLICATION DATA

This application claims the benefit of U.S. Provisional Patent Application No. 63/131,392, filed Dec. 29, 2020, the contents of which are incorporated herein by reference as if explicitly set forth.

BACKGROUND

Social networking applications provide a vehicle for the sharing of user content such as photos or videos. In some instances, the photos or videos may be supplemented by augmented reality or other effects that are generated live on a camera feed and displayed on the display of a mobile device for preview. The user can preselect and manipulate effects to apply to the live camera feed, and when satisfied initiate capture of an image or a recording of a video including the effects. The captured video or photo can then be shared on the social networking platform.

Photos can easily be edited after capture, but it may be desirable to provide additional options for enhancing or editing captured or stored videos.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
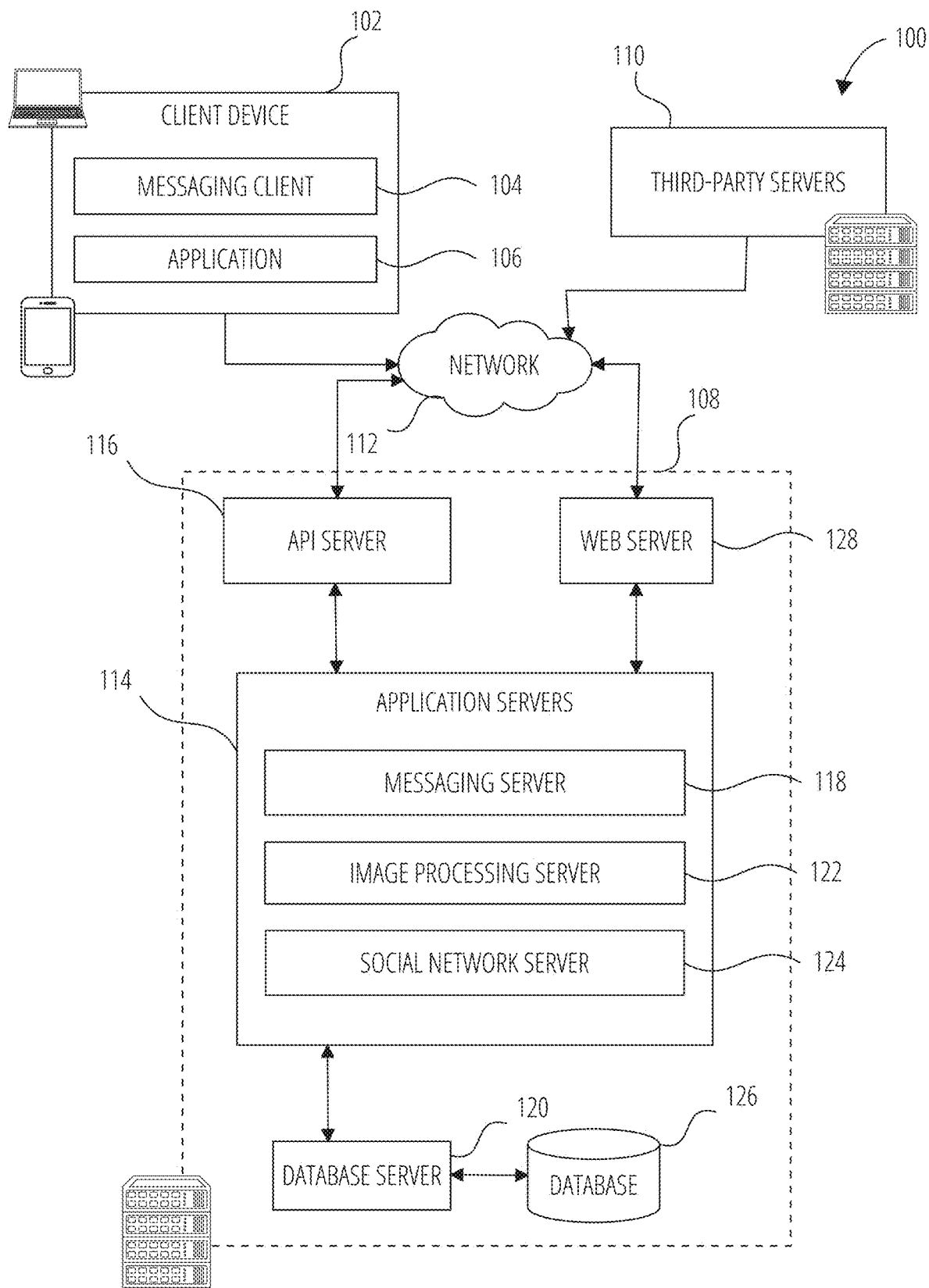
FIG. 1 is a diagrammatic representation of a networked environment in which the present disclosure may be deployed, in accordance with some examples.

Disclosed are systems and methods for providing convenient and efficient video editing functionality. In some examples, an edited version of a video file is created or recorded in the background while the original version of the video file is being displayed. Various user interface elements, representing effects that can be applied to the original video file, are presented for user input. Particular effects that are selected by the user are applied to the original version of the video file while it is being displayed. The original version as modified by the effects is recorded as the effects are applied, thereby to generate the edited version of the video file on the fly. Also provided is a sequential video version stack that includes a list of information about existing versions of the displayed video, for which a corresponding video file is stored on the mobile device or remotely, and the version currently being recorded and edited. By displaying and permitting manipulation of the original video file while the edited version is being recorded in the background, a mobile video device that has limited display space can provide effective and convenient video editing.

In one example, provided is a method of generating a modified video file via a user interface presented on a mobile video device including a display. The method includes displaying media corresponding to a first video file on a display of the mobile video device, in response to detecting an initial user input, begin generating a second video file corresponding to the displayed media in the background, receiving further user inputs to manipulate the first video file while the media corresponding to the first video file is being displayed on the display, and continuing generating the second video file from the first video file as manipulated by the further user inputs.

The user interface may include a video version stack including information on the first video file, the second video file, and any other versions of the first video file or the second video file.

The method may further include receiving prior user inputs to define persistent effects before receiving the initial user input, and generating the second video file from the first video file at least partly based on the inputs defining the persistent effects. The method may also include, prior to generating the second video file, receiving preview user inputs to manipulate the first video file during the displaying of the media corresponding to the first video file, and displaying the media corresponding to the first video file as manipulated by the preview user inputs.

In one example, the method further includes displaying second media corresponding to the second video file on the display of the mobile video device, in response to receiving a second initial user input, begin generating a third video file corresponding to the displayed second media in the background, receiving second further user inputs to manipulate the second video file while the media corresponding to the second video file is being displayed, and continuing generating the third video file from the second video file as manipulated by the second further user inputs.

The user interface may include a first effects bar partially overlaying the displayed media, the first effects bar including a user-selectable effect. The user-selectable effect may include a discrete effect or a range of an effect. The user interface may include a second effects bar partially overlaying the displayed media, the second effects bar including a user-selectable effect, the first effects bar and the second effects bar being positioned at opposite sides of the displayed media.

In another example, provided is a computing apparatus comprising a processor and a memory storing instructions that, when executed by the processor, configure the apparatus to generate a modified video file via a user interface presented on a mobile device including a display by performing the methods and limitations described above, including but not limited to displaying media corresponding to a first video file on a display of the mobile video device, in response to detecting an initial user input, begin generating a second video file corresponding to the displayed media in the background, receiving further user inputs to manipulate the first video file while the media corresponding to the first video file is being displayed on the display, and continuing generating the second video file from the first video file as manipulated by the further user inputs.

In a further example, provided is a non-transitory computer-readable storage medium including instructions that when executed by a computer, cause the computer to perform operations to generate a modified video file via a user interface presented on a mobile device including a display, by performing the methods and limitations described above, including but not limited to operations comprising displaying media corresponding to a first video file on a display of the mobile video device, in response to detecting an initial user input, begin generating a second video file corresponding to the displayed media in the background, receiving further user inputs to manipulate the first video file while the media corresponding to the first video file is being displayed on the display, and continuing generating the second video file from the first video file as manipulated by the further user inputs.

The operations may further include receiving prior user inputs to define persistent effects before receiving the initial user input, and generating the second video file from the first video file at least partly based on the inputs defining the persistent effects. The operations may also include, prior to generating the second video file, receiving preview user inputs to manipulate the first video file during the displaying of the media corresponding to the first video file, and displaying the media corresponding to the first video file as manipulated by the preview user inputs.

In one example, the operations further include displaying second media corresponding to the second video file on the display of the mobile video device, in response to receiving a second initial user input, begin generating a third video file corresponding to the displayed second media in the background, receiving second further user inputs to manipulate the second video file while the media corresponding to the second video file is being displayed, and continuing generating the third video file from the second video file as manipulated by the second further user inputs.

The user interface may include a first effects bar partially overlaying the displayed media, the first effects bar including a user-selectable effect. The user-selectable effect may include a discrete effect or a range of an effect. The user interface may include a second effects bar partially overlaying the displayed media, the second effects bar including a user-selectable effect, the first effects bar and the second effects bar being positioned at opposite sides of the displayed media. The user interface may also include a video version stack including information on the first video file, the second video file, and any other versions of the first video file or the second video file.

FIG. 1 is a block diagram showing an example messaging system 100 for exchanging data (e.g., messages, media and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Figure 2:
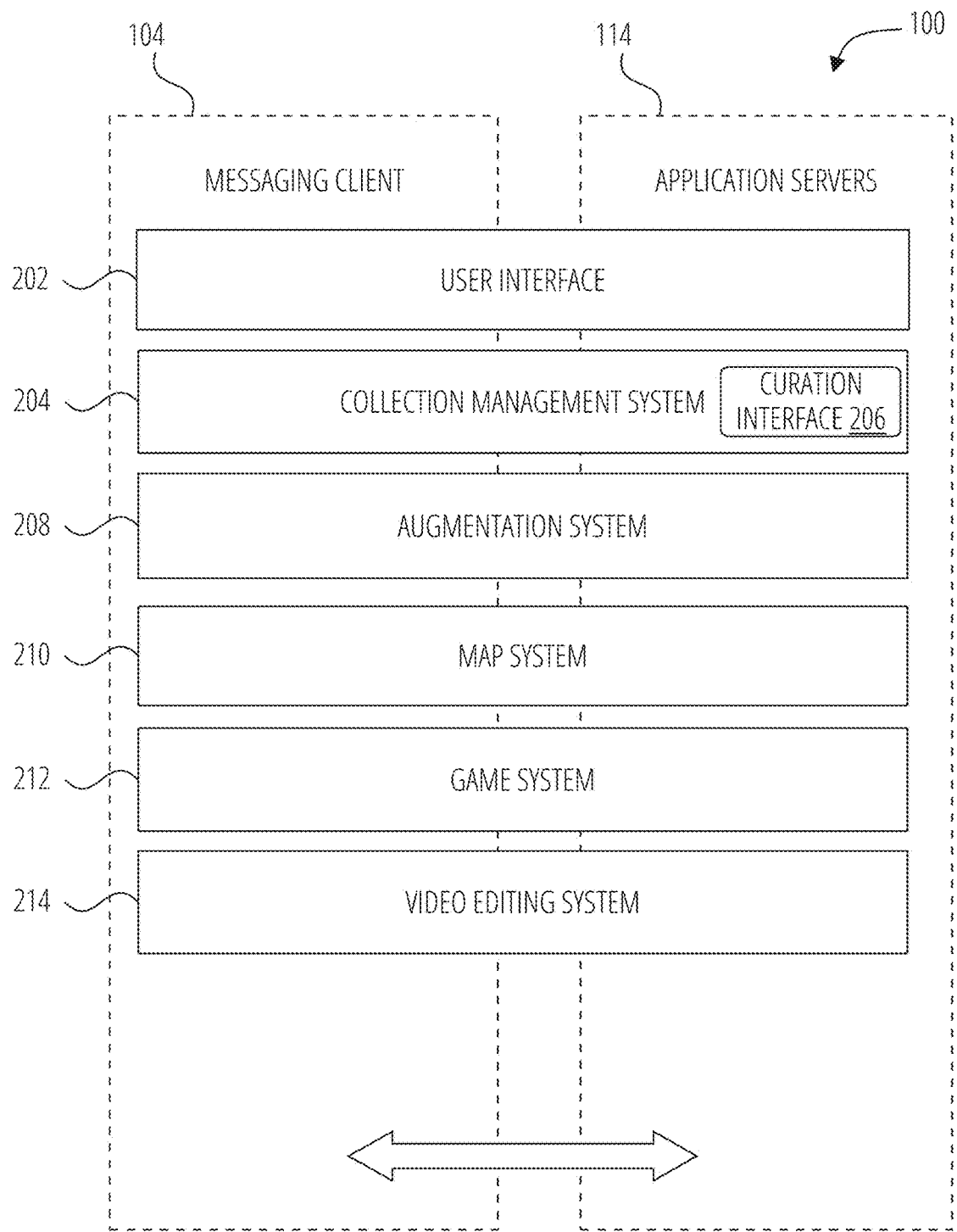
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever-side by the application servers 114. These subsystems include, for example, a user interface 202, a collection management system 204, an augmentation system 208, a map system 210, a game system 212, and a video editing system 214.

The user interface 202 is responsible for providing output to and receiving input from a user of the messaging client 104 on the client device 102. The user interface provides a user-manipulatable display output on a display (see further user output components 1126 in FIG. 11 and as described below) of the client device 102 as is known in the art. In one example, the user interface comprises a chat interface whereby a user can send and receive messages and associated content from one or more remote users. The user interface 202 also permits a user to manipulate live or captured media, for example by providing augmented reality effects on captured photos or videos, or on a live feed from a camera of the user device. In addition, as disclosed herein, the user interface 202 provides a method of generating or editing captured or stored video.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages).

Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports the voice and text messaging (e.g., chats) within the context of gameplay, provides a leaderboard for the games, and also supports the provision of in-game rewards (e.g., coins and items).

The video editing system 214 provides conventional video editing functions. In response to inputs received from the user interface 202, the video editing system can, for example, permit a user to adjust video parameters (perceived playback speed, brightness, color tone, and so forth), add sound or visual effects, or perform other manipulation to a video file as displayed or saved. The video editing system receives video editing commands and parameters from the user interface 202, and in response, creates a modified version of a video file based on an existing video file and the received commands and parameters.

Figure 3:
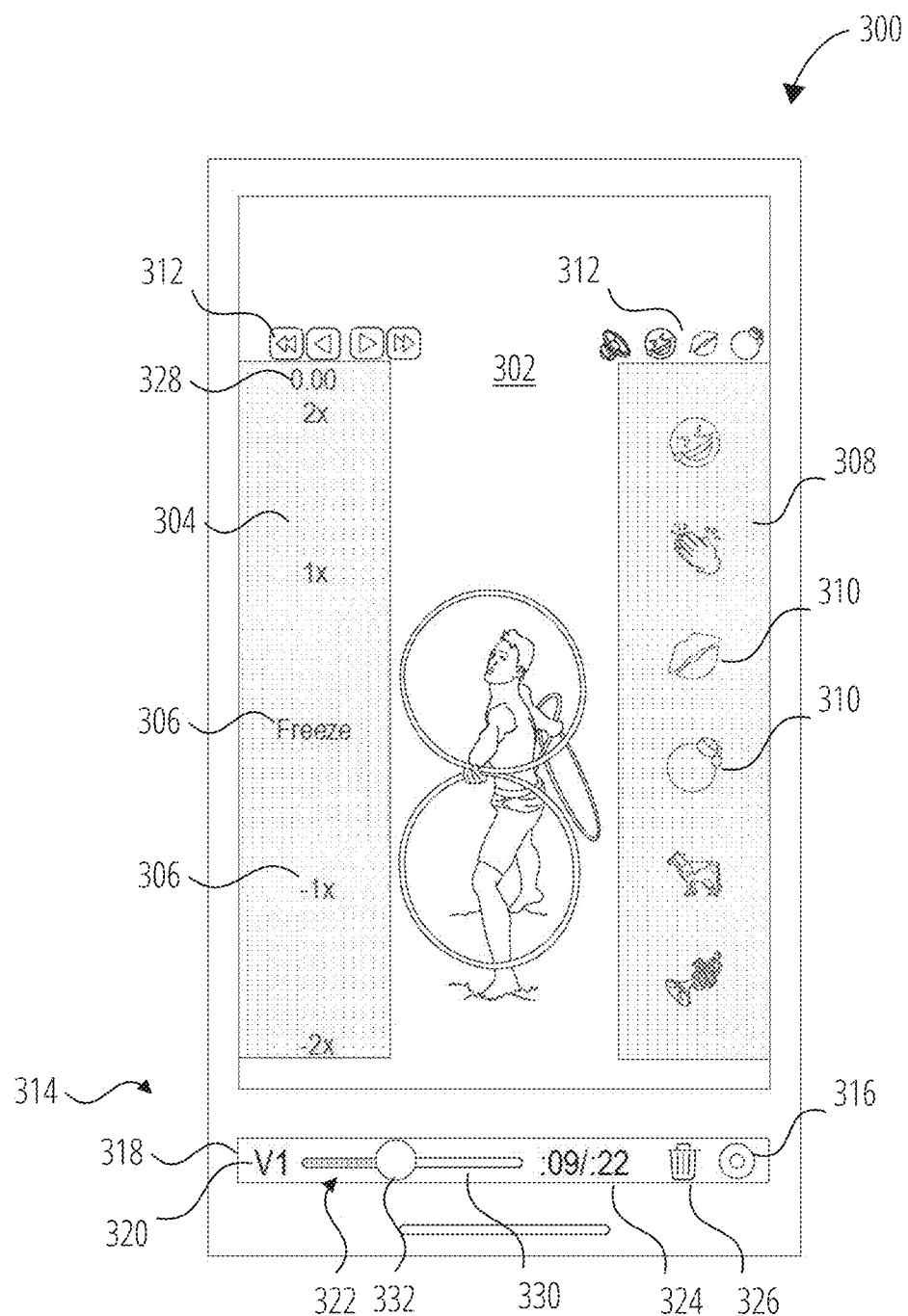
FIG. 3 shows a user interface that may be used in video editing on a mobile device, according to one example.

FIG. 3 shows a video editing interface 300 that may be used in video editing on a mobile device, according to one example. The video editing interface 300 is displayed on the display screen of a client device 102. In one example the video editing interface 300 is displayed when a user selects a video editing mode from a messaging client 104 or other app, or from a camera user interface on the client device 102.

The video editing interface 300 includes displayed video 302, a left hand side effects bar 304, a right hand side effects bar 308 and a video version stack 314. The displayed video 302 corresponds to a selected video file whose version number 320 is listed in the video version stack 314. The displayed video 302 is displayed as controlled and modified by optional user-selected inputs provided on effects bar 304, effects bar 308 and/or video version stack 314. The displayed video, depending on user inputs, may be being played at variable speeds, forwards, backwards, or be a still image if the video file is paused.

The effects bar(s), as displayed on a touch screen of the client device 102, provide a user interface for manipulating the displayed video 302. The effects bars may comprise any selection of audio or visual effects that can be applied to displayed video 302, including for example variation in speed, sound effects to apply, AR content, visual filters, an adjustment of brightness or color tint, or any other video or audio editing effect. The effects bars may conveniently be located along the left and right side of a conventional portrait aspect ratio display, which permits a user conveniently to manipulate left and right effects bars with one or both thumbs. Alternatively, including for example on devices with larger screens, there could be multiple effect bars on either side of the screen, or at the top or bottom as well.

The effects bars are preferably translucent to allow the displayed video 302 to be comprehended while maintaining the visibility of the information contained in the effects bars.

The effects bars may receive input simultaneously depending on whether or not the client device 102 supports multiple touch functionality. Displayed above each effects bar is an effects bar title 312, which identifies the particular effects bar and is selectable by a user to choose another effects bar or hide the effects bar as described in more detail below with reference to FIG. 4. An effects bar title could include text, icons, static images or animated images, and so forth.

For example, the effects bar 304 illustrated in FIG. 3 permits user control of the speed of playback of the displayed video 302. The effects bar 304 includes a number or range of displayed effects 306, which may either represent discrete playback-related values, for example from −2× (reverse at twice the normal speed) to "Freeze" (pause) to 2× (forward at twice the normal speed) or may be a playback speed that varies substantially continuously from the user's perspective depending on the vertical position of the user's touch along effects bar 304. Additionally, the discrete values may comprise more values than displayed, for example a 1.5× speed between 1× and 2×, a −0.5× speed between "Freeze" and −1×, and so forth. Also provided in effects bar 304 is a value header 328 ("0.00" in FIG. 3) showing the playback speed value currently selected. As shown in FIG. 3, the playback has been frozen (i.e., 0× speed). The value header 328 could be shown elsewhere, such as to the side of the effects bar 304 moving vertically as a user slides a finger or thumb up or down the effects bar 304.

As a user touches or sweeps along effects bar 304, the displayed video 302 will be shown on the display at the corresponding playback speed. In the implementation where discrete values are provided in effects bar 304, as the user's touch passes the halfway mark or reaches another boundary between two discrete values, the next discrete value will be selected. In other words, if a user touches the "Freeze" label and start sliding their finger up, about halfway between "Freeze" and "1×", the "1×" value will be selected as the playback speed. Effectively, in such an implementation of discrete values of the range, the value will snap to the next value where it will remain until the user's touch moves into the zone corresponding to the next range in the direction of motion, or until a new touch is detected in a different zone. In the case where the playback varies substantially continuously, the playback will be derived from the position of the user's touch along the height of effects bar 304. In one example a hybrid implementation provides "snap to" values corresponding to traditional or integer playback speeds when user touch is detected within a certain tolerance of a displayed integer playback speed but with variable playback speed between the snap-to zones of the integer playback speeds.

The effects bar 304 may also include a lock icon that can toggle between a locked and an unlocked mode. The effects bar 304 is typically active and any selection of a displayed effect 306 will result in the corresponding effect immediately being applied to the displayed video 302. This might present challenges, for example if the user wishes to create a new version that starts at a particular playback speed or direction at a particular location in the displayed video 302. In such a case, user selection of the lock icon will fix the display speed and direction as currently chosen. The displayed video 302 can then be positioned at a desired starting location for creation of the new version, using the slider 322. The displayed video 302 will then hold at that position until the record icon 316 is pressed, at which point recording of a new version and playback of the current displayed video 302 at the desired speed and direction (or frozen) will continue. At this point the effects bar 304 will return to the unlocked mode so that further manipulation of playback parameters using effects bar 304 is possible.

The effects bar 308 on the other hand, comprises a number of displayed effects 310 comprising icons corresponding to sound effects that may be applied to the displayed video 302. The sound effects may for example include (from top to bottom), canned laughter, the clapping of hands, a kissing sound, an explosion, an animal sound, or a trumpet herald, or any other sound effect or clip. The user could simply tap any one of the displayed effects 310 to play a given sound once or the user could hold their finger or thumb down on a displayed effect 310 to play the given sound repeatedly. Accordingly, it will be appreciated that the effects bars can include three types of values: discrete (e.g., playback rates), continuous (e.g., a color spectrum), and unrelated (e.g., individual sound effects).

Effects bars could hold more icons than might fit on the screen. For example, in response to receiving an up or down scroll motion along effects bar 308, additional displayed effects 310 could enter the effects bar 308 from the top or bottom of the effects bar 308. In another example, the effects bars are customizable. For example, by long-pressing a displayed effect 310, or pressing and dragging it toward the middle of the display screen another pop-up (or "fly-out") menu could appear with additional options/values. Additionally, the order of displayed effects 310 can be rearranged by holding and then dragging a specific displayed effect 310 to a different location within the effects bar 308. In addition or alternatively, a long press provides an option to delete or hide a sound displayed effect 310 from the effects bar 308. An effect (e.g., displayed effect 310 in effects bar 308 corresponding to a sound effect) could also be removed from the effects bar 308 by dragging it off the effects bar 308.

To avoid user input conflicts or confusion between the actual application of effects to the displayed video 302 and modifying or reordering the contents of an effects bar, in one example the user interface displayed by the messaging client 104 on the client device 102 includes one or more separate setup screens or modes in which a user can select and reorder displayed effects. For example, a small "settings" icon is provided, which would toggle the video editing interface 300 between a mode in which, for example, a long press plays a sound effect repeatedly, and one in which deletion or reordering of displayed effects is possible as described above. Additionally, the messaging client 104 typically includes, as part of its existing user interface, a button to Save the currently active video to the device's "Camera Roll" so that other apps on the client device 102 an access it, a Story button to publish the currently video to their personal "Story" or user feed so that their connections can see it, and a Send To button for the full range of conventional sending options for the currently active video.

In another example, a custom or "favorites" effects bar is generated in response to user input. For example, upon receipt of a long press on a displayed effect, a heart or other symbol is displayed, and selection of the symbol by the user includes the particular displayed effect in a group of favorites. A selectable Favorites effects bar could then be generated for easy access to favorite effects. The Favorites effects bar may also include different items from different effects bars. For example, one selected favorite could be a 2× playback speed from the effects bar 304, while another could be a laughter sound effect from effects bar 308. The Favorites effects bar, when selected, would be displayed in place of effects bar 304 or effects bar 308. The selection of effects bars is described in more detail below with reference to FIG. 4.

Any number of effects bars with any conceivable video or audio effects or parameter adjustments may be provided. Some further examples of possible effects bars include: variations of effects bar 304 to include extreme speeds or slow motion, variations of effects bar 308 to provide adjustment of brightness level (to permit fade in/fade out effects or to wash out the color) or grayscale, an audio player in which a song can be selected and played back as accompaniment to the video, an audio autotune effect, a volume control for the existing audio accompanying the displayed video 302. Additionally, effects bars providing AR effects, to include 3D effects, objects, characters, and transformations may be provided, as well as effects bars defining more traditional image filters. Effects bars may also permit input derived from the position components 1136 of the client device 102. For example, the displayed video 302 may be warped by tilting the client device 102 from side to side, or made to shake by shaking the client device 102.

In the case of audio effects bars, for example, an effects bar for the existing audio accompanying the current version of the video (or likely the ambient audio in the case of the original version of the video) is provided with a vertical volume slider and a mute/unmute icon. Similarly, an audio effects bar providing an audio player includes a vertical volume slider, a mute/unmute icon, and traditional audio playback icons such as pause and play. A song or other audio may be selected from the user's audio file library or a streaming service and cued up for playback. During editing, the ambient or existing audio can then be faded out or in, in response to user input on the existing-audio effects bar, while the song or other audio is faded in or out in response to user input on the audio player effects bar.

It will be appreciated that many variations and combinations are possible.

Figure 7:
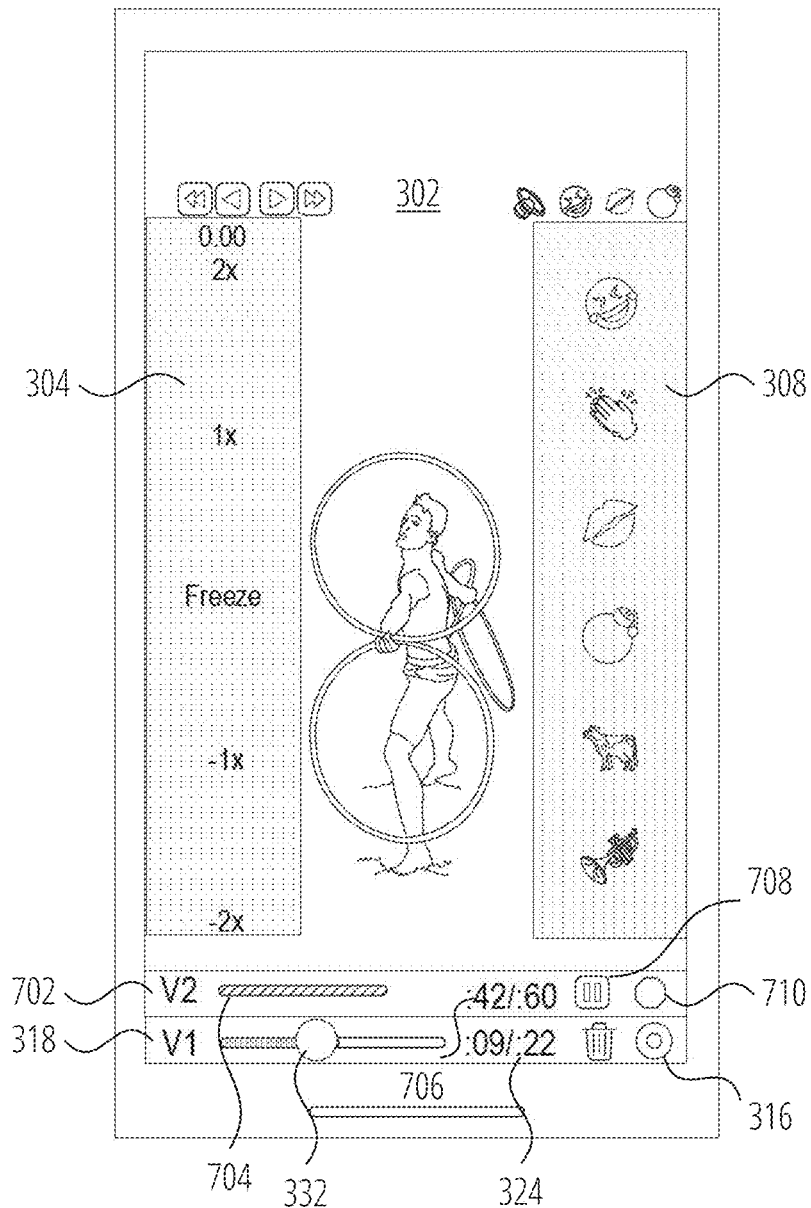
FIG. 7 shows the user interface of FIG. 3 while a new version of the video is being created.

The video version stack 314 includes a list or stack of information (or "version bars") about existing versions of displayed video 302, for which a corresponding video file is stored on client device 102 or remotely, or that is being recorded and edited. One example of a version bar is version bar 318 in FIG. 3. The information and associated controls in each version bar in the video version stack 314 will depend on a number of factors, including whether the version is active (such as version bar 318), inactive (but activatable), or corresponds to a version is being generated (see version bar 702 in FIG. 7). Version bars may include a version number 320 and one or more control interfaces such as slider 322, delete icon 326, record icon 316, a play/pause icon 816 (FIG. 8), stop icon 710 (FIG. 7), or pause/record icon 708 (FIG. 7). Also included is current/total time indicator 324, which reflects the current time position in the video file corresponding to displayed video 302 and total time of the same. Examples of different version bars are discussed below with reference to FIG. 8.

As the user creates successive versions of the displayed video 302, the video version stack 314 grows vertically, with each subsequent version appearing above the most recent version in the video version stack 314. The video version stack 314 may have a limited height to only show the N most recent video version bars, in which case the video version stack 314 could scroll in response to the user providing up or down touch input in the video version stack 314.

The slider comprises a progress bar 330 and a slider button 332 whose position along the progress bar 330 represents the current position of the displayed video. During playback, the slider button 332 glides across the progress bar 330 from the start (0.00 seconds, at the far left) to the end (far right). The slider button 332 is user selectable to advance or rewind the displayed video 302 by selecting the slider button 332 and sweeping it to the right or left respectively. Depending on the implementation or user setting, moving the button left or right does not initially disturb the displayed video 302, but when released by the user, the displayed video jumps to the position in the video file corresponding to the new location of the slider button 332 along the progress bar 330. In other cases, user inputs indicating specifying movement of the slider button 332 to the left or right "scrubs" the video in the corresponding direction at the corresponding speed.

A delete icon 326 is selectable to permit deletion of a version, a record icon 316 is selectable to initiate the creation of a new version, a playback icon initiates or resumes playback of a version, a stop icon stops playback or recording of a version, and a pause icon pauses playback or recording of a version. In some cases, icons may toggle between two functions, for example pause and play or record and pause.

Figure 4:
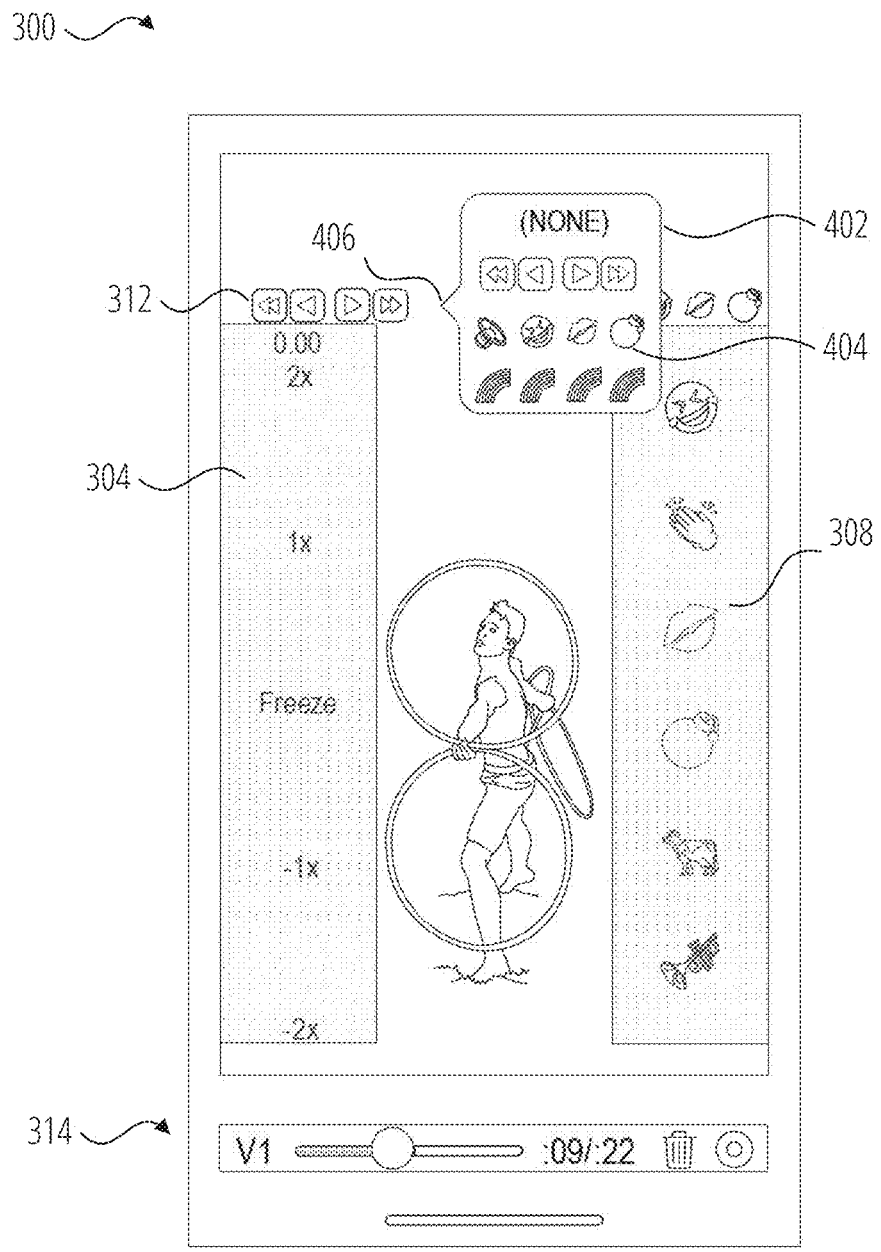
FIG. 4 shows an effects bar menu user interface that may be provided in the user interface of FIG. 3, according to one example.

FIG. 4 shows an effects bar menu user interface that may be provided in the user interface of FIG. 3, according to one example.

When a user taps on an effects bar title, e.g., effects bar title 312, an effects bar menu 402 pops up. The effects bar menu 402 includes a list of available effects bars as well as a "None" selection option. Selecting the "None" option will result in removal of that effects bar, but a selectable "None" effects bar title 502 (see FIG. 5) will remain visible, permitting a user to access the effects bar menu 402 by selecting the "None" effects bar title 502. As can be seen, available effects bars are identified in the effects bar menu 402 by a selectable display of their respective effects bar titles, e.g., effects bar title 404, but could also comprise a different means of identification such as text titles, icons, static images or animated images, and so forth.

Selection of an effects bar title in effects bar menu 402 results in the corresponding effects bar being displayed on the side of the video editing interface 300 indicated by the effects bar menu 402. For example, the left side of the window for effects bar menu 402, which was selected via effects bar title 312 in the example of FIG. 4, as is shown by indicator 406.

If the user selects an effects bar for one side of the video editing interface 300 but that effects bar is already displayed on the other side of the display, then the selected effects bar will be displayed as selected, and it will disappear from its other position and the "None" effects bar title 502 or something similar will typically be displayed.

However, if an effects bar contains more effects than can be displayed at one time, then an additional effects bar of the same type is displayed in addition to the already-displayed effects bar. For example, if the "Sounds Effects" effects bar 308 contains 10 different sound effects, but can only display 5 at a time, then selection of the effects bar title 404 in effects bar menu 402 results in a second version of the effects bar 308 being displayed on the left hand side, which could be used to display the final 5 sound effects. For example, the user can then scroll down in one of the versions of the effects bar 308 to reveal the additional sound effects, or the additional sound effects could be displayed by default to complement the first 5 sound effects. This would let the user have access to all of the sound effects at once.

For other effects bars, there may not be any advantage to having the same effects bar displayed in more than one location. For example, if the effects bar 304 corresponds to a speed and direction effects bar, it may only make sense to have it in one location or on one side of the video editing interface 300.

Figure 5:
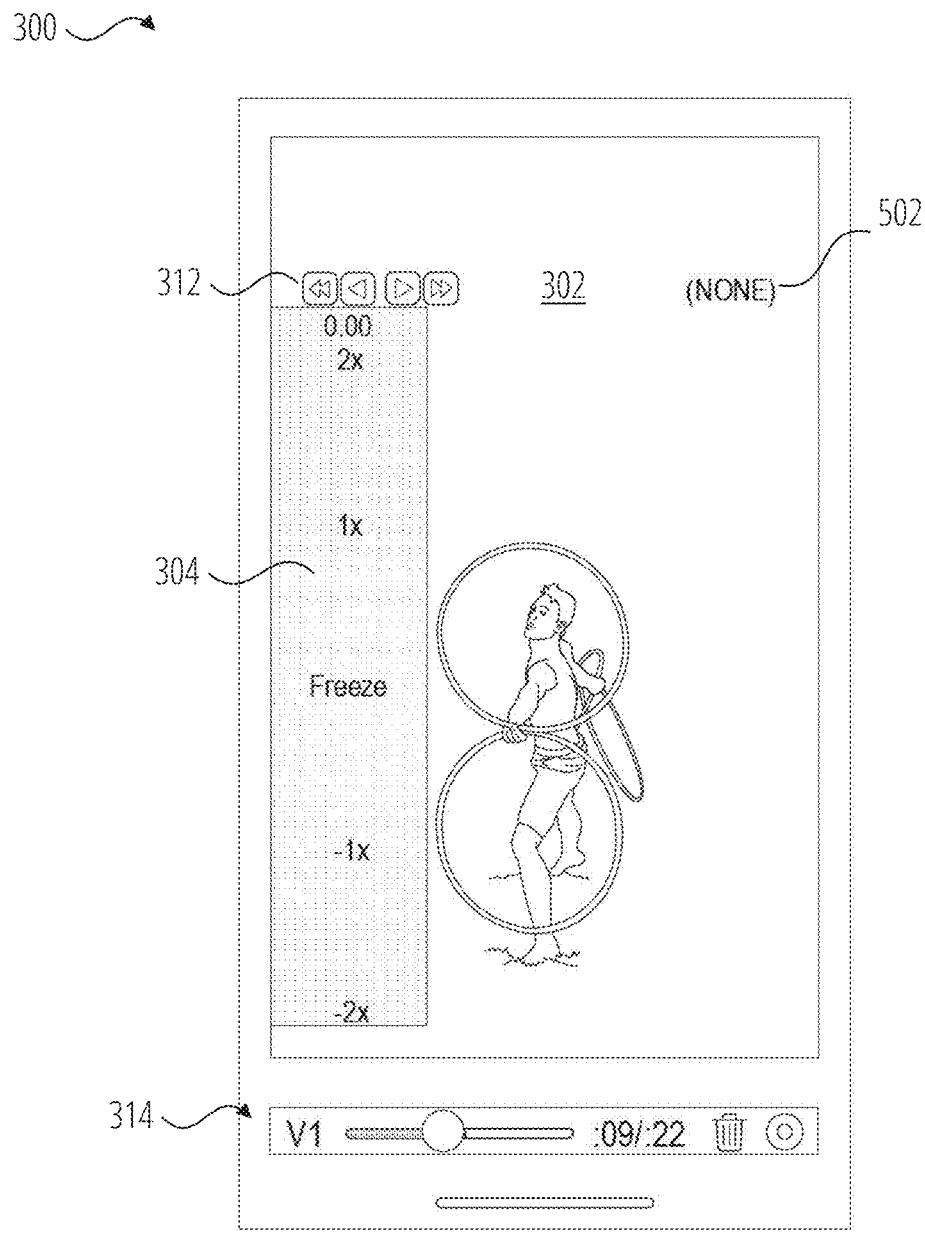
FIG. 5 shows an optional variation of the user interface of FIG. 3, according to one example.

FIG. 5 shows an optional variation of the user interface of FIG. 3, according to one example. FIG. 5 shows an example of the video editing interface 300 in which the right hand side bar has been deselected using an effects bar menu 402. As can be seen, no effects bar is shown on the right hand side of the user interface, but the "None" effects bar title 502 is present to allow an effects bar to be reselected for the right hand side if desired.

Figure 6:
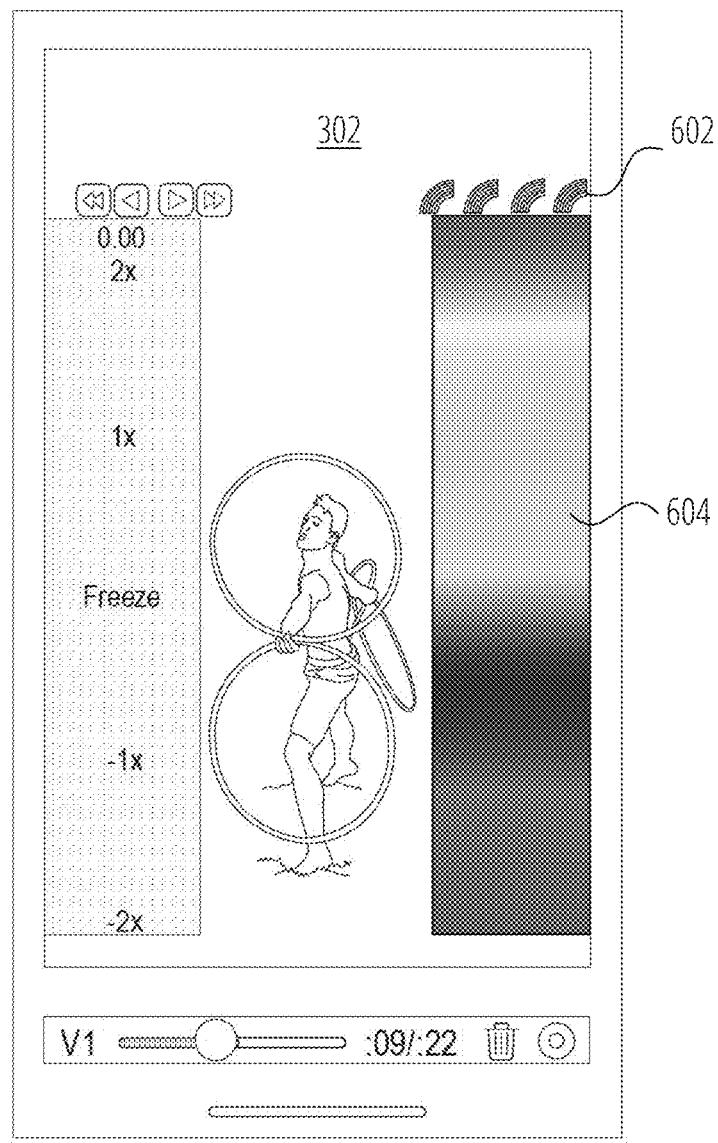
FIG. 6 shows an alternative version of the user interface of FIG. 3, according to one example.

FIG. 6 shows an alternative version of the user interface of FIG. 3, according to one example. In this case, a color tint effects bar 604 has been selected for display on the right of the video editing interface 300. The effects bar 604 is, as before, identified by its effects bar title 602. The color tint effects bar 604 comprises a vertically-arranged spectrum of colors that can be selected by touch input (drag or tap) at a desired vertical position along effects bar 604. A rainbow of all possible colors is displayed in the effects bar 604 in one example. The color corresponding to the selected position in effects bar 604 will be applied to the entire displayed video 302. If a user drags their finger off/out of the effects bar 604, this will remove the tint and no color tint will then be applied to the displayed video 302.

In a further example, effects bar 604 could also let the user select the "transparency" or intensity of the effect. In one implementation, there would be variation in the transparency or intensity of the color tint effect based on touch position in a horizontal direction. One side of the effects bar would be "solid" color tint and the other side would be "faint" color tint. This allows the user to choose both the color tint (vertical position) and how strong/thick they want the effect to be (horizontal position), all within one effects bar.

The color tint effects bar 604 may also provide selectable areas with common values or colors. For example, there could be 6 squares across the top of the effects bar to let the user choose solid red, solid blue, solid green, solid yellow, solid black, solid white, or three at the top and three at the bottom. There could also be a special area within the effects bar in other locations, for example a "no color" location that could be tapped or into which a user could drag a finger or thumb to remove color tinting, in addition to being able to drag outside the effects bar 604. For example, a "no color" input area could be provided on one side of the effects bar 604 in the middle vertically.

In FIG. 3, the video editing interface 300 is shown in a trial or rehearsal mode. In this mode, during playback of a version, user inputs applied to the effects bar 304, effects bar 308, and slider 322 will cause the corresponding effects or parameters to be applied to the displayed video 302 without modifying the video file corresponding to the current version or creating a new version. This permits a user to rehearse effects and parameters in advance of creating a new version. For example, a user may press the play button to start playback of the video, may apply different speeds (or freeze the displayed video 302) using effects bar 304 and may apply different sound effects from effects bar 308 to try out different effects and effects placements in the displayed video 302 in advance of creating/recording a new version. The user may also practice switching between different effects bars as desired.

When a user is ready to create a new version of the displayed video 302, any desired initial parameters, such as playback speed and direction, color tint, and so forth, will be selected. The displayed video 302 will then be positioned at a desired starting point in displayed video 302 using slider 322 or play/pause buttons. Upon receipt of user selection of the record icon 316, recording of a new version will begin as described in more detail below.

FIG. 7 shows the user interface of FIG. 3 while a new version of the video is being created. As illustrated in FIG. 7, version 2 "V2" in version bar 702 is being created/recorded in response to record icon 316 being pressed in version bar 318. In some implementations, the maximum length (e.g., 60s) or the file size of a new version may be limited. The progress of version 2 toward this limit is shown by progress bar 704 and a display of recording elapsed/total time indicator 706. Recording of version 2 is paused by pause/record icon 708, which will toggle to a user selectable record icon to permit the recording to continue. A stop icon 710 is also provided, which will stop the recording of the new version at the current recording elapsed time, which will then become the total time of the version. It will be appreciated that a new version of a video may be shorter or longer than the original video due to the possibility of engaging effects (like "Freeze" or slower or faster or reverse playback).

In FIG. 7, while version 2 is being recorded, the displayed video 302 corresponds to the version in the version stack whose record icon 316 was pressed, at the location in that version indicated the current time shown in its current/total time indicator 324, as modified by any effects currently selected in any of the effects bars described above or otherwise provided. The modifying effects may already be in place and persist until changed, such as playback speed and direction, color tint, and so forth. The modifying effects may also be transient effects such as sound effects from effects bar 308. As the displayed video 302 progresses (or not, if "Freeze" has been selected in effects bar 304) version 2 is created based on what is presented as displayed video 302 as modified by any effects.

That is, the new/edited version (V2 in version bar 702 in FIG. 7) records in the background while the displayed video 302 is the version (V1 in version bar 318 in FIG. 7) on which the new/edited version is based, as modified by any effects. The creation of V2 will continue in the background until the pause/record icon 708 or stop icon 710 is selected or the total time or size limit is reached, irrespective of whether or not effects or playback parameters are provided. The video file corresponding to the underlying version (V1) on which the new version is based is unchanged by selected effects, which are only applied to the new/edited version V2. As illustrated in FIG. 7, the new/edited version V2 is not displayed in video editing interface 300 or otherwise on the display of the client device 102 while it is being generated from version V1.

For example, user input may be received to specify a playback speed and direction, initial color tint, and starting position in displayed video 302, which corresponds to V1 in FIG. 7. When the record icon 316 is then selected, the recording of the new/edited version (V2 in FIG. 7) commences with displayed video 302 being played back (or shown as a still image if "Freeze" has been selected) on the display of client device 102 at the initial speed and direction, with any preselected effects in place. V2 is then recorded from displayed video 302 as it progresses and as modified by any subsequent user-selected effects or modifications to the initial parameters. Selected sound effects are incorporated into new/edited version V2, changes in color tint or playback speed and direction are similarly incorporated, as the recording progresses. Any manipulation of displayed video 302 (V1) indicated by the selection of an effect in an effects bar or in slider 322 will be captured in the recording of the new/edited version (V2).

In the event that a user wants to skip to a different location in displayed video 302 (version 1 in FIG. 7), this can be done by dragging the slider button 332 in slider 322 to a new position and then releasing it. Displayed video 302 will then jump to the new position. Alternatively, the creation of the new/edited video V2 can be paused in response to user selection of pause/record icon 708, at which time a new position and new persistent effects can be selected, before recommencing recording in response to user selection of pause/record icon 708, which would of course be displaying a record icon in this suspended state, and not pause as shown in FIG. 7.

While the new/edited version V2 is being captured, different effects bars can be selected or deselected via effects bar menu 402 as discussed above with reference to FIG. 4. Selection/dismissal of effects bars will not affect the continued playback of displayed video 302 or recording of the new/edited version. When recording of the new/edited version is completed, as a result of user selection of stop icon 710 or as a result of reaching a maximum time or size, the new/edited version V2 is saved locally or remotely and is available for use as the underlying version for the creation of yet another new/edited version. The new/edited version V2 remains, in the illustrated example, in version bar 702 in the video version stack 314, with appropriate modifications to the content of video version stack 314. For example, version bar 318 will now reflect that V1 is an "inactive" version. The new version of the video (V2) includes all of the effects applied to V1 to create V2 during its recording.

V2 is then available for use in creating a further new/edited version, V3 in this case. The creation of V3 from V2 will proceed in the same general manner as the creation of V2 from V1. V3 will then include all of the effects applied to V1 to create V2, as well as any further effects applied to V2 during the creation of V3. In this manner, a user can conveniently layer effects on subsequent versions without having to get everything done and get everything right in one take.

For example, a user may choose to focus on playback speed and direction effects in the first new/edited version (V2), sound effects may be applied in the second new/edited version (V3), fades in and out may be applied in the third edited version (V4), and so on to a completed edited video.

In some examples, each version (except the first version) can be deleted using a trash icon in the corresponding video bar in the video stack, to permit the user to discard intermediate versions if no longer needed, or to delete the latest version if unsatisfactory. In another example, only the most recent version (excluding the first version) can be deleted.

Figure 8:
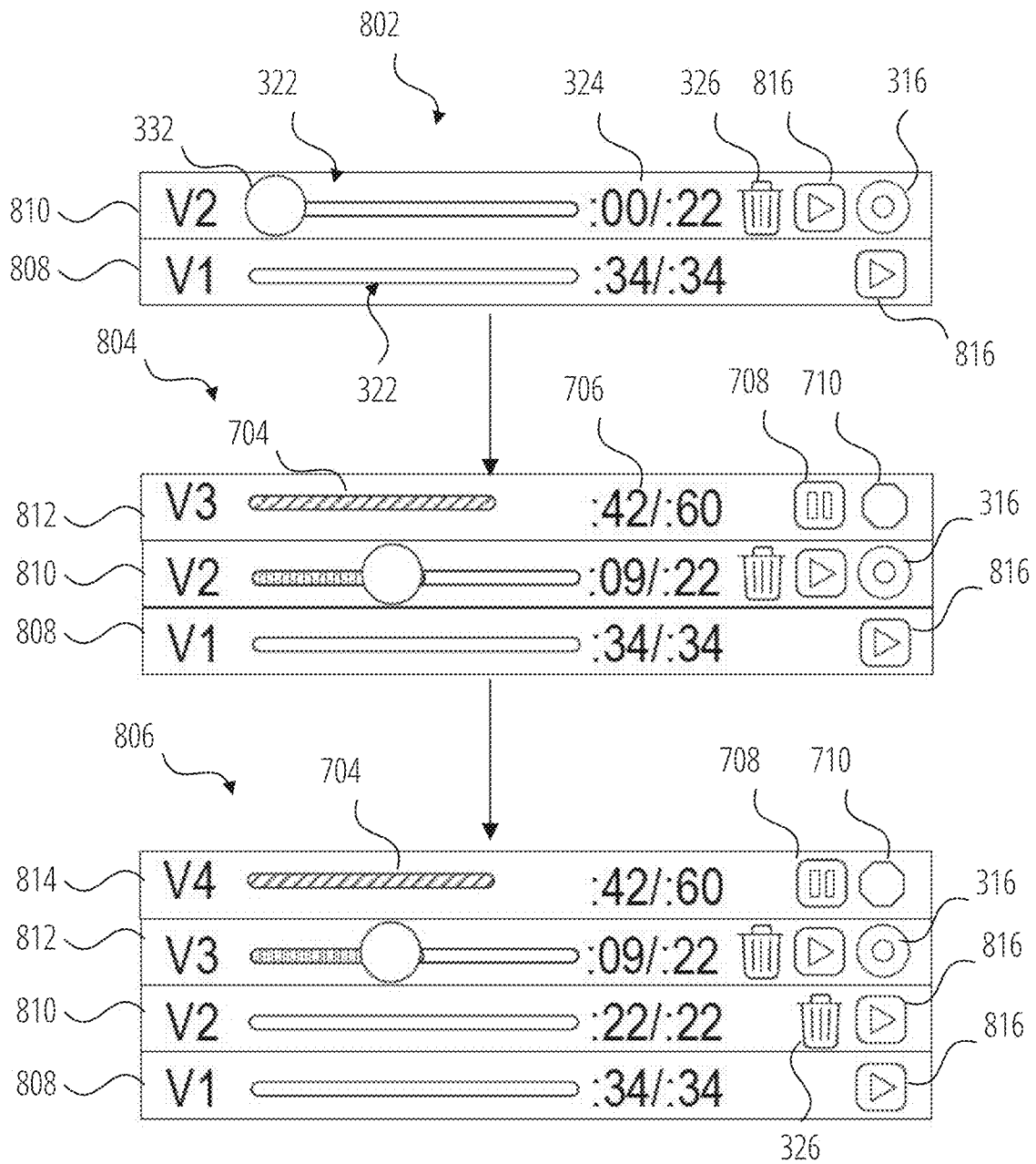
FIG. 8 shows the progression of a video version stack as additional versions are added, in one example.

FIG. 8 shows the progression of a video version stack 314 as additional versions are added, in one example. As illustrated, video version stack 802 comprises video version bar 808 and video version bar 810. Video version stack 802 for example could correspond to the video stack after the first new version (V2 in video version bar 810) has been created using the method described in flowchart 1000 of FIG. 10. Video version bar 808, which is currently inactive, can be seen to include slider 322 and a play/pause icon 816. Being inactive, slider 322 of video version bar 808 does not include a slider button 332. Video version bar 808 is activated by pressing play/pause icon 816 or by touching video version bar 808, at which point version 1 (the original version) of the video will become the displayed video 302 and a slider button 332 will appear in slider 322.

Conventionally, video version bar 808 corresponding to the original video (V1) does not include a delete icon 326. If the user desires to record new versions of a different video, the user exits the video editing interface 300 to return to a previous display of the video in the messaging client 104, camera roll or other application. Video version bar 808 differs from version bar 318 of FIG. 1 in this regard.

Video version bar 810 is currently active as can be seen from the presence of slider button 332, and version 2 of the video is thus currently the displayed video 302. Version 2 of the video and video version bar 810 will both be deleted in response to user selection of the delete icon 326 in video version bar 810. Video version bar 810 also includes a play/pause icon 816 and a record icon 316.

As discussed previously, the displayed video 302 (corresponding to the active video version bar) can be selected for sharing, saving, and so forth. Accordingly, any of the videos in a video version stack can be selected for sharing, saving, and so forth by making its video version bar active by selecting it.

User selection of the record icon 316 in video version bar 810 will transition the video version stack 802 to video version stack 804. New video version bar 812 corresponding to version 3 is added to video version stack 802 above video version bar 810 to create video version stack 804. As can be seen, video version bar 812 includes progress bar 704, pause/record icon 708 and stop icon 710. Video version bar 812 corresponds to and functions like version bar 702 described above with reference to FIG. 7. Video version bar 810 is active in video version stack 804 and is functionally the same as version bar 318 described above with reference to FIG. 3 and FIG. 7. Upon completion of recording, video version bar 812 in video version stack 804 will transition to the active state of video version bar 810 shown in video version stack 802, and video version bar 810 will become inactive as shown in video version stack 806, with a delete icon 326 and play/pause icon 816 in place of pause/record icon 708 and stop icon 710.

User selection of the record icon 316 in video version stack 804 (now in video version bar 812 after completion of recording of V3, and no longer in video version bar 810 in video version stack 804) will transition the video version stack 804 to video version stack 806. New video version bar 814 corresponding to video version 4 is added to video version stack 804 above video version bar 812 to create video version stack 806. As can be seen, video version bar 814 in video version stack 806 includes a progress bar 704, pause/record icon 708 and stop icon 710. Video version bar 814 corresponds to and functions like version bar 702 described above with reference to FIG. 7. Video version bar 812 is active in video version stack 804 and version 3 is thus the displayed video 302. Upon completion of recording, video version bar 814 in video version stack 806 will transition to the active state of video version bar 810 shown in video version stack 802, and video version bar 812 will become inactive.

Video version bars also include current/total time indicators 324 or recording elapsed/total time indicators 706 as appropriate.

Deletion of any of the existing video versions using a delete icon 326 results in deletion of the corresponding video version bar and video, and the video version stack will be adjusted accordingly. For example, deletion of video version bar 810 in video version stack 806 results in the removal of this video version bar from the video version stack 806, video version bar 812 and video version bar 814 will drop down and may be renumbered to versions 3 and 4 respectively.

In the example shown in FIG. 8, only the most recent version of the existing videos shown in the video version stack can be used to create a new/edited video. There will thus be a clear progression of the editing performed in consecutively numbered versions. Otherwise the lineage of a later version may not be remembered or obvious. This is done by only providing a record icon 316 in the video version bar corresponding to the most recent version. In an alternative embodiment, it is possible to create a new/edited video from any of the existing versions shown in the video version stack, by providing additional record icons 316 in addition to play/pause icons 816.

Figure 9:
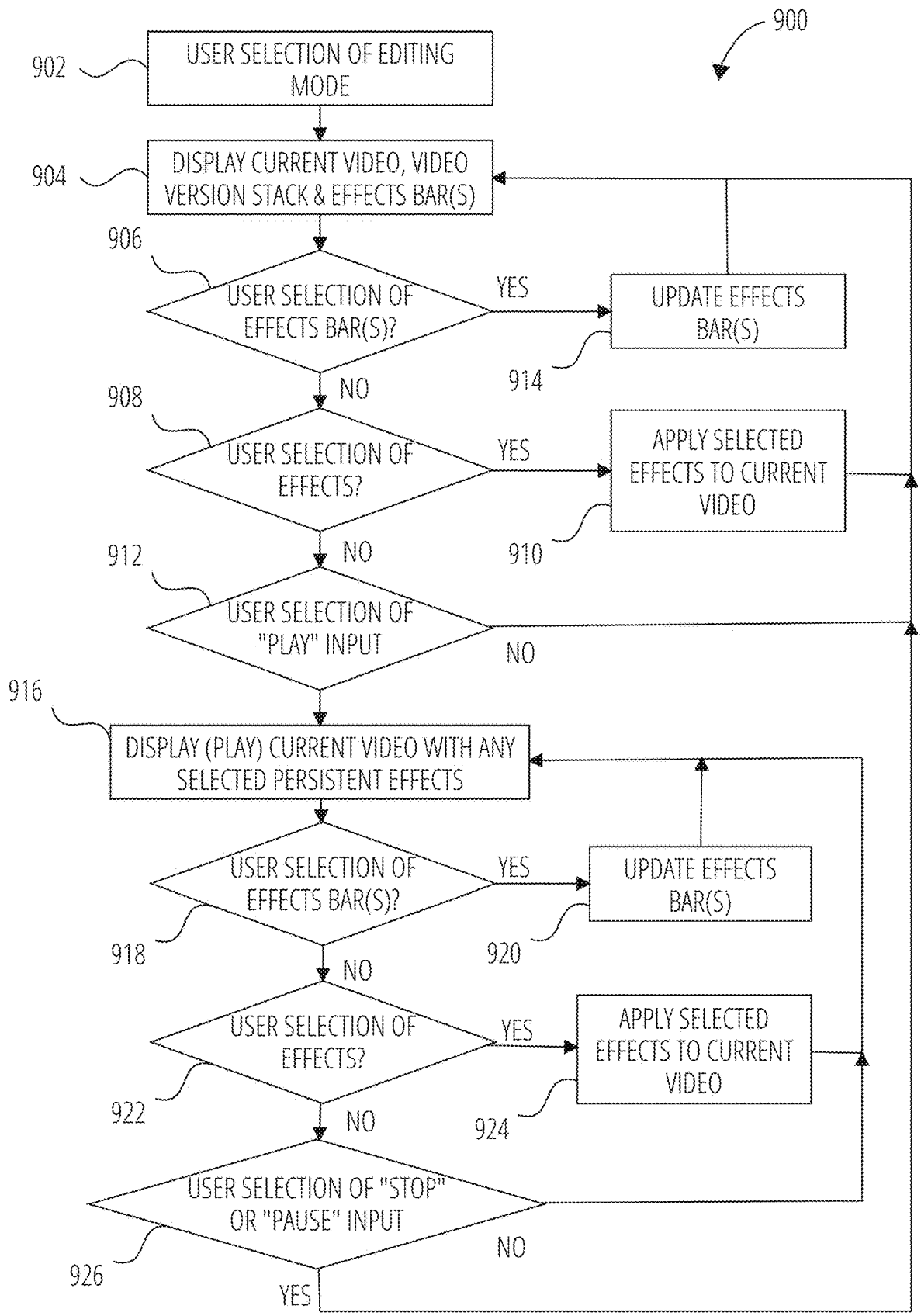
FIG. 9 is a flowchart showing operation of the messaging system in trial or rehearsal mode, according to one example.

FIG. 9 is a flowchart 900 showing operation of the messaging system 100 in trial or rehearsal mode, according to one example. The operations illustrated in FIG. 9 will typically execute on client device 102 in an application such as messaging client 104, a video editing application, or a camera application provided with the messaging client 104. Various implementations are of course possible, with some of the operations taking place in application servers 114, or with one application calling another application or SDK for required functionality. In one example, the operations are performed jointly between the user interface 202 and video editing system 214 embodied in messaging client 104 running on client device 102. For the purposes of clarity, flowchart 900 is discussed herein with reference to such an example.

Prior to the commencement of the flowchart 900, the messaging client 104 is in a state in which a video is available for editing. For example, a user may have just finished capturing a video using a camera included in client device 102 or may have loaded or selected a video from the client device's "camera roll" of stored videos and images. The video file is currently the active or selected item on the display of the client device 102.

The method starts at operation 902 with the messaging client 104 detecting user input corresponding to selection of an editing mode. In response, in operation 904, the messaging client 104 displays the current (e.g., the captured or selected) video in a user interface on the client device 102, including effects bars and a video version stack. For example, the display may correspond generally to the user video editing interface 300 as illustrated in FIG. 5 or FIG. 3. The user interface will include a video version stack 314, which at this time will only include a version 1 (V1) video version bar as shown in FIG. 5. The user interface will also include one or more effects bars, which may be default effects bars, user specified effects bars, or correspond to the effects bars that were displayed the last time the user edited a video as described herein. The displayed video is either cued up and stopped at its starting position (i.e., at time zero) or cued up or running at the position or time at which the user selection of the editing mode was detected. At this point there will be no applied effects (e.g., color tints or brightness variations) and the playback parameters will default to 1X forward speed.

If the messaging client 104 detects user input corresponding to selection of the choice or customization of effects bars at operation 906, then the messaging client 104 updates the choice of effects bars and any customizations at operation 914, after which the method returns to operation 902. An example of such selection and customization is described above with reference to FIG. 4.

If the messaging client 104 detects user input corresponding to selection of effects at operation 906, then the messaging client 104 applies the selected effects to the presentation of the current video at operation 910, after which the method returns to operation 904. As described above with reference to FIG. 3 to FIG. 7, the effects may be persistent until changed, for example a color tint or brightness or playback speed or direction, or could be transient, for example the audio playback of a sound effect. Selection of a new location in the current video using slider 322 is also contemplated in operation 906.

At operation 912, if user input corresponding to a "play video" request has not been detected, the method returns to operation 904. Operations 904 to 914 then continue until either a user "play" input is detected at operation 912 or user input to exit the editing mode is detected. The operations that occur if user input corresponding to a "record" input is detected are described below with reference to FIG. 11.

After receiving a "play" input at operation 912, the messaging client 104 plays the current video on the display screen of the client device 102. The playback commences at the current location in the current video, with any initial persistent effects in place, such as a color tint or brightness or playback speed or direction.

If user input corresponding to selection of the choice or customization of effects bars is detected at operation 918, then the messaging client 104 updates the choice of effects bars and any customizations at operation 920, after which the method returns to operation 916. An example of such selection and customization is described above with reference to FIG. 4.

If user input corresponding to selection of effects is detected at operation 922 then the messaging client 104 applies the selected effects to the presentation of the current video at operation 924, after which the method returns to operation 916. As described above with reference to FIG. 3 to FIG. 7, the effects may be persistent until changed, for example a color tint or brightness or playback speed or direction, or could be transient, for example the audio playback of a sound effect. Selection of a new location in the current video using slider 322 is also contemplated in operation 922.

At operation 926, if user input corresponding to a "stop video" or "pause video" request has not been detected, the method returns to operation 916. Operations 916 to 926 then continue until either a user "stop video" or "pause video" input is detected at operation 912, at which point the method returns to operation 904 with the current video stopped or paused.

Figure 10:
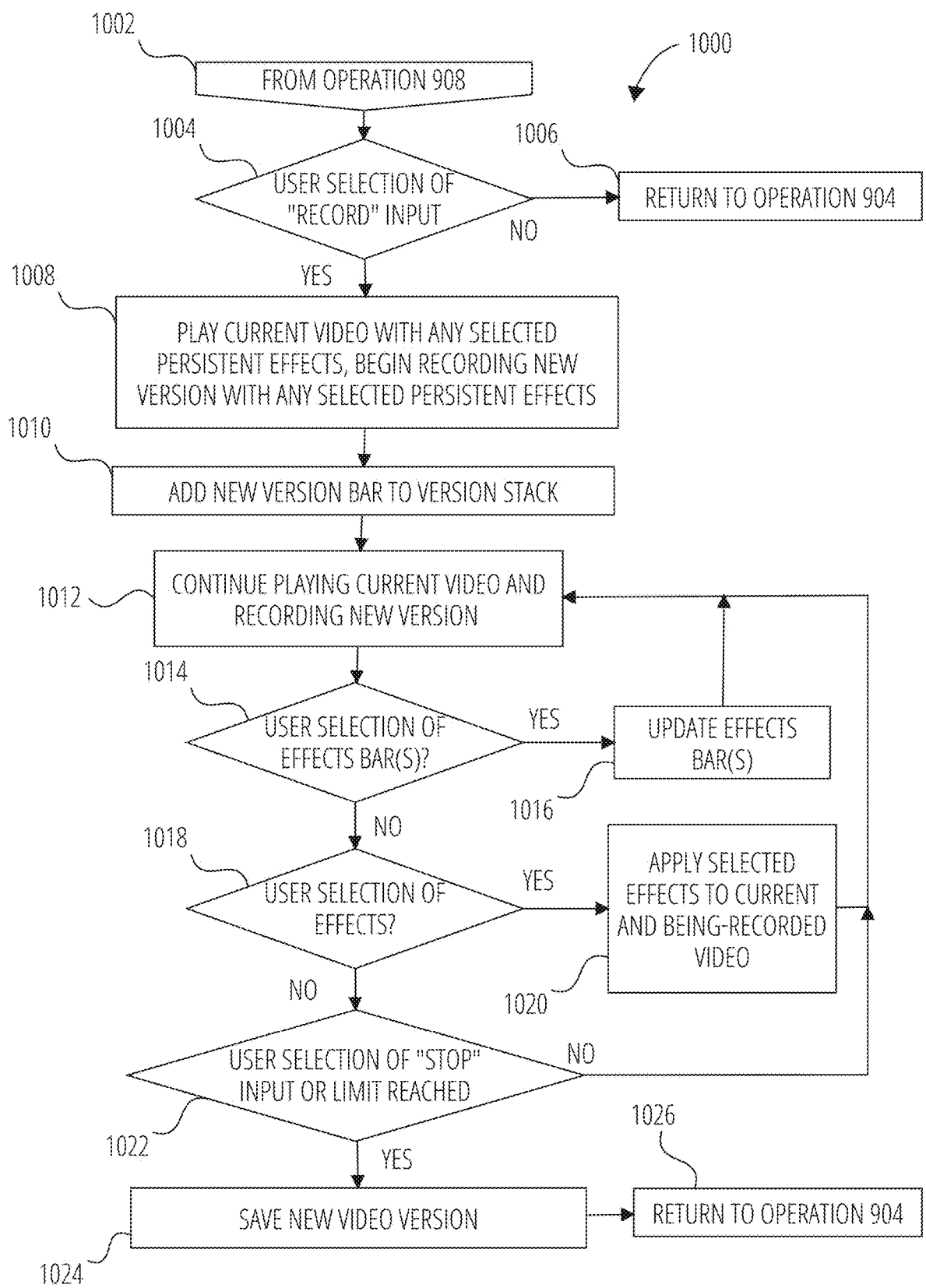
FIG. 10 is a flowchart showing operation of the messaging system in recording/editing mode, according to one example.

FIG. 10 is a flowchart 1000 showing operation of the messaging system 100 in recording/editing mode, according to one example. The operations illustrated in FIG. 10 will typically execute on client device 102 in an application such as messaging client 104, a video editing application, or a camera application provided with the messaging client 104. Various implementations are of course possible, with some of the operations taking place in application servers 114, or with one application calling another application or SDK for required functionality. In one example, the operations are performed jointly between the user interface 202 and video editing system 214 embodied in messaging client 104 running on client device 102. For the purposes of clarity, flowchart 1000 is discussed herein with reference to such an example.

Prior to the commencement of the flowchart 1000, the messaging client 104 is in a state in which a video has been selected for editing and the messaging client 104 has been operating according to flowchart 900 in which a user has entered the editing mode and has been experimenting or rehearsing with effects and effects bar setup as discussed above. As illustrated, the flowchart 1000 could for example be a replacement of or alternative branch to the lower portion of flowchart 900, in which operation 1004 corresponds to operation 912.

The method starts at operation 1004 with the messaging client 104 detecting user input corresponding to selection of a recording/editing mode. The method may commence for example from operation 908 in flowchart 900 as illustrated by connector 1002, with a corresponding display by the messaging client 104 of a current video and video editing interface 300 as discussed with reference to FIG. 9. In response to receiving user input corresponding to selection of the record mode, the messaging client 104 plays the current video in a user interface on the client device 102 from the current location or time with any currently-selected persistent effects applied, and at the same time messaging client 104 begins recording a new version of the video in the background also with any currently selected persistent effects applied as shown at operation 1008.

As before, the user interface will include a video version stack, and one or more effects bars. At operation 1010, an additional version bar is added to the top of the video version stack. The version number will be incremented from the current highest version number in the video version stack. An example of the evolution of a video version stack is described above with reference to FIG. 8. The messaging client 104 will then continue playing the current video and recording the new version at operation 1012

If user input corresponding to selection of the choice or customization of effects bars is detected at operation 1014, then the messaging client 104 updates the choice of effects bars and any customizations at operation 1016, after which the method returns to operation 1012. An example of such selection and customization is described above with reference to FIG. 4.

If user input corresponding to selection of effects is detected at operation 1018, then the messaging client 104 applies the selected effects to the display of the current video and to the recording thereof at operation 1020, after which the method returns to operation 1012. As described above with reference to FIG. 3 to FIG. 7, the effects may be persistent until changed, for example a color tint or brightness or playback speed or direction, or could be transient, for example the audio playback of a sound effect. Selection of a new location in the current video using slider 322, pausing of the current video and other playback-related operations are also contemplated in operation 1020. Also, as discussed previously, it is possible to pause recording of the new video, in which case the displayed video and the user interface can be manipulated as shown in the loops including operation 1014, operation 1016, operation 1018 and operation 1020 but any effects selected and applied in operation 1018 and operation 1020 will not be applied to the new version since recording has been paused. Recording of the new version will then resume at operation 1012 upon receipt of a record user input, with any changes to the persistent effects, video location, playback speed, and so forth. taking effect in the recording of the new video as it resumes.

At operation 1004, if user input corresponding to a "play video" request has not been detected, the method returns to operation 904 as shown at operation 1006.

At operation 1022, if user input corresponding to a "stop video" has not been detected or the recording of the new video has not reached a predefined time or file size limit, the method returns to operation 1012. Operations 1012 to 1020 then continue until either a user "stop video" input is detected at operation 1022 or the new video reaches the predefined limit at operation 1022. In response, the messaging client 104 saves new video version locally or remotely at operation 1024 and the method returns in operation 1026 to operation 904 in flowchart 900, with an updated video version stack including the newly created video version.

Figure 11:
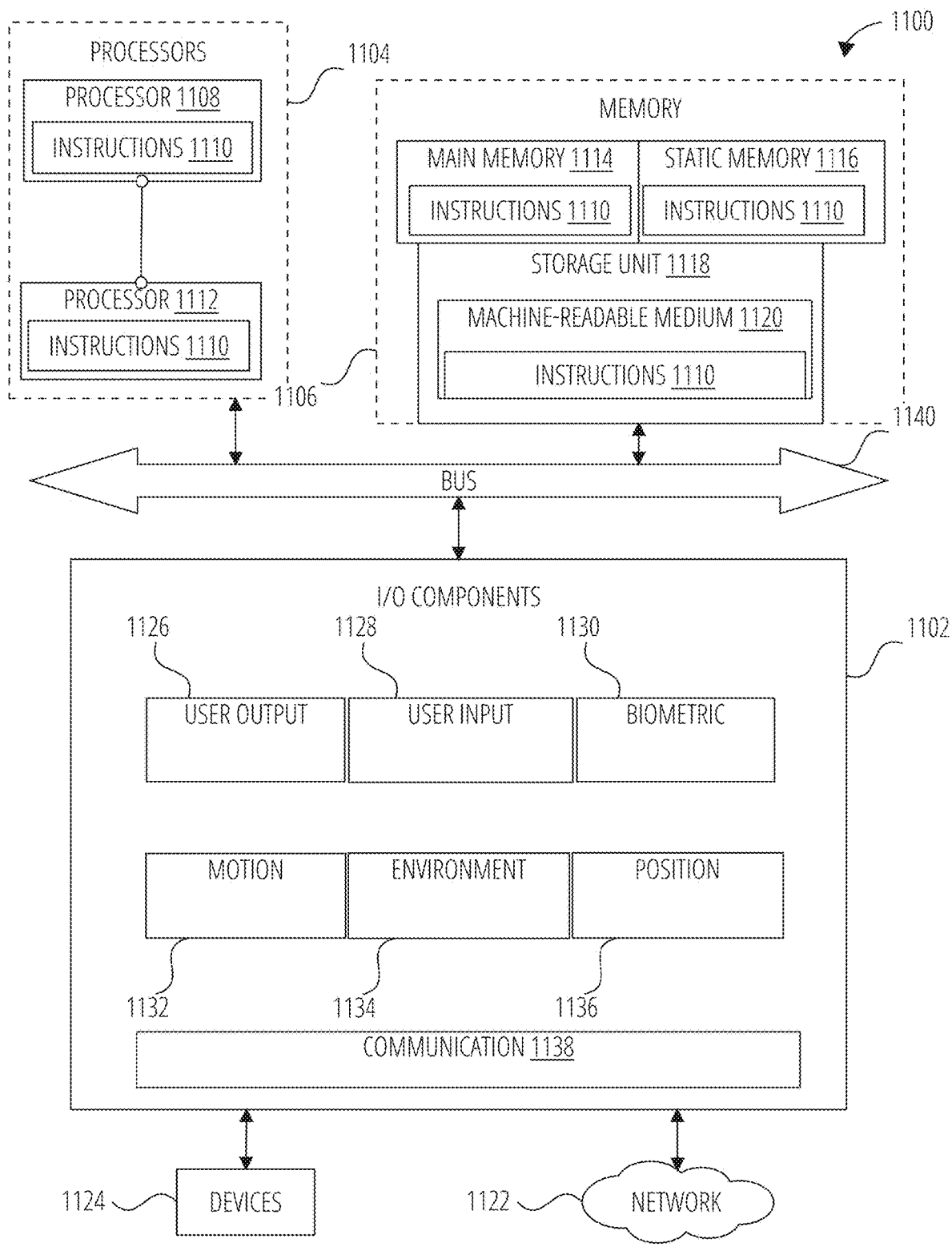
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 (e.g., client device 102) within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Figure 12:
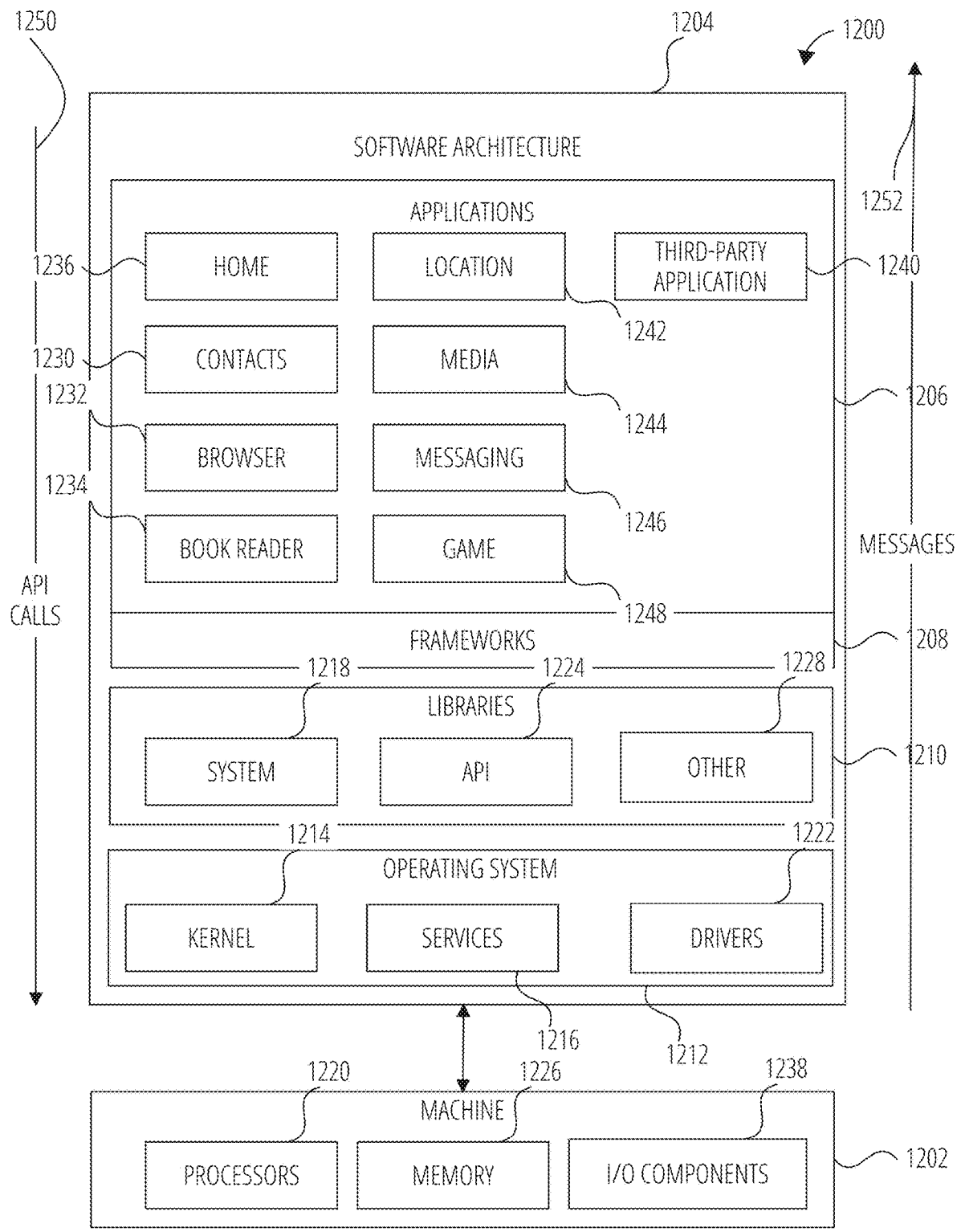
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246 (e.g., messaging client 104), a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1104 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method of generating a modified video file via a user interface presented on a mobile video device including a display, comprising:
   displaying a video version stack including a first version bar with information on a first video file and a second version bar with information on a second video file generated from the first video file;
   receiving user selection of one of either the first version bar or the second version bar corresponding to an individual video file of the first and second video files;
   displaying media from the individual video file corresponding to the selected version bar on the display of the mobile video device while displaying the video version stack;
   in response to detecting an initial user input comprising selection of a record icon located in the selected version bar, begin generating a third video file corresponding to the displayed media while displaying the video version stack;

receiving further user input to manipulate the individual video file corresponding to the selected version bar while the media from the individual video file corresponding to the selected version bar is being displayed on the display;

displaying a third version bar in the video version stack, the third version bar including information on the third video file; and continuing generating the third video file from the individual video file corresponding to the selected version bar as manipulated by the further user input while displaying the video version stack.

2. The method of claim 1 wherein the selected one of the first version bar and the second version bar comprises a progress indicator to indicate playback progress of the individual video file corresponding to the selected version bar.

3. The method of claim 1 further comprising:
receiving prior user inputs to define persistent effects before receiving the initial user input; and
generating the third video file from the individual video file corresponding to the selected version bar at least partly based on the inputs defining the persistent effects.

4. The method of claim 1 further comprising:
prior to generating the third video file, receiving preview user inputs to manipulate the individual video file corresponding to the selected version bar during the displaying of the media from the individual video file corresponding to the selected version bar; and
displaying the media from the individual video file corresponding to the selected version bar as manipulated by the preview user inputs.

5. The method of claim 1 wherein the user interface comprises simultaneous display of:
a first vertical effects bar partially overlaying the displayed media, the first effects bar including a user-selectable effect; and
a second vertical effects bar partially overlaying the displayed media, the second effects bar including a second user-selectable effect,
wherein the first effects bar and the second effects bar are positioned at opposite left and right sides of the displayed media while the video version stack is being displayed along a single third side, the third side being between the left and right sides.

6. The method of claim 1 wherein the user interface comprises a first vertical effects bar partially overlaying the displayed media, the first vertical effects bar including a user-selectable effect, the first effects bar being displayed while the video version stack is being displayed.

7. The method of claim 6 wherein the user-selectable effect comprises a discrete effect or a range of an effect.

8. The method of claim 6 wherein the user interface comprises a second vertical effects bar partially overlaying the displayed media, the second vertical effects bar including a second user-selectable effect, the first vertical effects bar and the second vertical effects bar being positioned at opposite left and right sides of the displayed media.

9. The method of claim 1 wherein the first and second version bars each include a delete icon located therein, user selection of the delete icon in the first or the second version bar causing deletion of the corresponding first or second video file respectively.

10. A non-transitory computer-readable storage medium, the computer-readable storage medium including instructions that when executed by a computer, cause the computer to perform operations to generate a modified video file via a user interface presented on a mobile device including a display, the operations comprising:
displaying a video version stack including a first version bar with information on a first video file and a second version bar with information on a second video file generated from the first video file;
receiving user selection of one of either the first version bar or the second version bar corresponding to an individual video file of the first and second video files;
displaying media from the individual video file corresponding to the selected version bar on the display of the mobile video device while displaying the video version stack;
in response to detecting an initial user input comprising selection of a record icon located in the selected version bar, begin generating a third video file corresponding to the displayed media while displaying the video version stack;
receiving further user input to manipulate the individual video file corresponding to the selected version bar while the media from the individual video file corresponding to the selected version bar is being displayed on the display;
displaying a third version bar in the video version stack, the third version bar including information on the third video file; and
continuing generating the third video file from the individual video file corresponding to the selected version bar as manipulated by the further user input while displaying the video version stack.

11. The computer-readable storage medium of claim 10 wherein the selected one of the first version bar and the second version bar comprises a progress indicator to indicate playback progress of the individual video file corresponding to the selected version bar.

12. The computer-readable storage medium of claim 10 wherein the operations further comprise:
receiving prior user inputs to define persistent effects before receiving the initial user input; and
generating the second video file from the individual video file corresponding to the selected version bar at least partly based on the inputs defining the persistent effects.

13. The computer-readable storage medium of claim 10 wherein the operations further comprise:
prior to generating the second video file, receiving preview user inputs to manipulate the individual video file corresponding to the selected version bar during the displaying of the media from the individual video file corresponding to the selected version bar; and
displaying the media from the individual video file corresponding to the selected version bar as manipulated by the preview user inputs.

14. The computer-readable storage medium of claim 10 wherein the user interface comprises simultaneous display of:
a first vertical effects bar partially overlaying the displayed media, the first effects bar including a user-selectable effect; and
a second vertical effects bar partially overlaying the displayed media, the second effects bar including a second user-selectable effect, wherein the first effects bar and the second effects bar are positioned at opposite left and right sides of the displayed media while the video version stack is being displayed along a single third side, the third side being between the left and right sides.

15. The computer-readable storage medium of claim 10 wherein the first and second version bars each include a delete icon located therein, user selection of the delete icon in the first or the second version bar causing deletion of the corresponding first or second video file respectively.

16. A computing apparatus comprising:
a processor; and
a memory storing instructions that, when executed by the processor, configure the apparatus to generate a modified video file via a user interface presented on a mobile device including a display by performing operations comprising:
displaying a video version stack including a first version bar with information on a first video file and a second version bar with information on a second video file generated from the first video file;
receiving user selection of one of either the first version bar or the second version bar corresponding to an individual video file of the first and second video files;
displaying media from the individual video file corresponding to the selected version bar on the display of the mobile video device while displaying the video version stack;
in response to detecting an initial user input comprising selection of a record icon located in the selected version bar, begin generating a third video file corresponding to the displayed media while displaying the video version stack;
receiving further user input to manipulate the individual video file corresponding to the selected version bar while the media from the individual video file corresponding to the selected version bar is being displayed on the display;
displaying a third version bar in the video version stack, the third version bar including information on the third video file; and
continuing generating the third video file from the individual video file corresponding to the selected version bar as manipulated by the further user input while displaying the video version stack.

17. The computing apparatus of claim 16 wherein the user interface comprises a first vertical effects bar partially overlaying the displayed media, the first vertical effects bar including a user-selectable effect, the first effects bar being displayed while the video version stack is being displayed.

18. The computing apparatus of claim 17 wherein the user-selectable effect comprises a discrete effect or a range of an effect.

19. The computing apparatus of claim 17 wherein the user interface comprises a second effects vertical bar partially overlaying the displayed media, the second effects bar including a user-selectable effect, the second vertical effects bar being displayed while the video version stack is being displayed, the first vertical effects bar and the second vertical effects bar being positioned at opposite left and right sides of the displayed media.

20. The computing apparatus of claim 16 wherein the selected one of the first version bar and the second version bar comprises a progress indicator to indicate playback progress of the individual video file corresponding to the selected version bar.

* * * * *